T. N. RUSSELL.
LUNCH-PAILS.
No. 195,050. Patented Sept. 11, 1877.
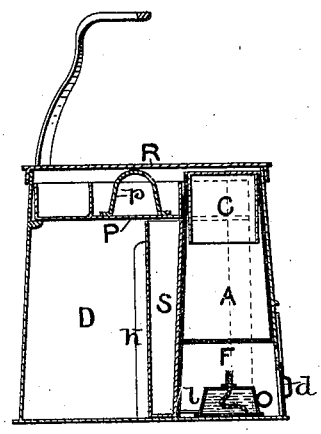
FIG. 1.
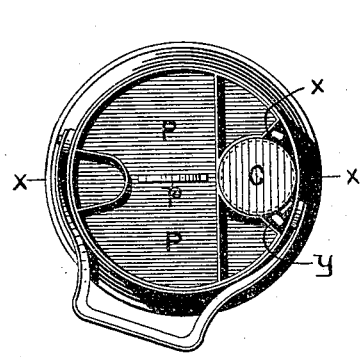 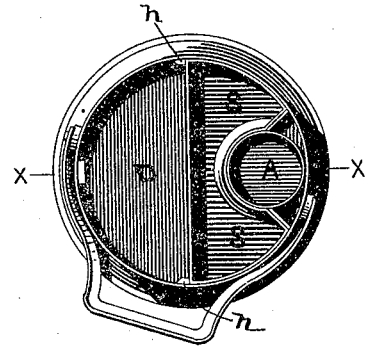
FIG. 2. FIG. 3.
WITNESSES. INVENTOR
Thomas N. Russell

UNITED STATES PATENT OFFICE.

THOMAS N. RUSSELL, OF PROVIDENCE, RHODE ISLAND.

IMPROVEMENT IN LUNCH-PAILS.

Specification forming part of Letters Patent No. 195,050, dated September 11, 1877; application filed May 23, 1877.

*To all whom it may concern:*

Be it known that I, THOMAS N. RUSSELL, of the city and county of Providence, and State of Rhode Island, have invented a new and Improved Lunch-Pail, of which the following is a specification:

The object of my invention is to combine, with an ordinary lunch or dinner pail, a convenient means for warming tea, coffee, or other drink, and also all liquid food, like soup, broth, or chowder, and also to provide separate apartments and receptacles within the pail for various articles of food.

In the accompanying drawings, Figure 1 is a vertical section of the lunch-pail on the line $x\,x$. Fig. 2 is a top view, with the cover removed. Fig. 3 is also a top view, with the cover and certain other parts removed.

A is a division or apartment inside the pail, and located on one side thereof, for holding tea, coffee, or other liquid, with a cover, C, which may serve as a drinking-vessel, and having underneath a lamp-chamber, F, for a lamp, $l$. The lamp is introduced through a slide or door, $a$, in the side of the pail, and suitable apertures are provided for admitting air to the flame. Small holes above and around the door, or through the door itself, may be employed in case the lamp is to be used in places exposed to the wind.

The apartment or coffee-urn A and chamber F may consist of a tube or cylinder made of tin or other suitable metal, extending from top to bottom of the pail, open at both ends, and soldered or otherwise fastened to the side thereof, and having a transverse partition forming the bottom of the coffee-urn. It is, however, obvious that there are various other forms in which this part of my invention can be embodied.

A soup-vessel, S, (shown in section in Fig. 1 and by a top view in Fig. 3,) is placed next to the coffee-urn A, and the adjacent side made to conform to the outer surface of the urn and lamp-chamber, or a considerable portion of the same, for the purpose of deriving heat therefrom. This vessel rests on the bottom of the pail, and is held in place by shoulders $h$, and is designed to contain soup or other liquid. It can be removed with its contents by drawing it up vertically, and may be left out altogether when not required for use. The space D outside the soup-vessel is appropriated for the solid portions of the luncheon.

Fitting into the top of the pail, and covering the space D, and also the soup-vessel, is a shallow flat-bottomed pan, P, with a handle, $p$, divided into several small spaces for containing butter, salt, mustard, and articles used in small quantities, and requiring to be kept separate.

Convenient spaces $x\,y$ are easily formed between the soup-vessel and coffee-urn for knives, forks, and spoons. The cover R, inverted, serves for a plate.

This lunch-pail is designed for laborers in the field, shop, factory, or elsewhere, who are compelled to eat cold food for want of convenient means for warming it, and also to protect the food from becoming frozen when kept, from necessity, in exposed places in winter time.

What I claim, and desire to secure by Letters Patent, is—

1. In a lunch-pail provided with the tea or coffee urn A, lamp-chamber F, and lamp $l$, the soup-vessel S, arranged, substantially as described, to derive heat by contact with the coffee-urn A and lamp-chamber F.

2. A lunch-pail provided with the coffee-urn A, lamp-chamber F, lamp $l$, soup-vessel S, food-space D, and pan P, substantially as and for the purposes specified.

THOMAS N. RUSSELL.

Witnesses:
L. O. ROCKWOOD,
FRANK E. ROCKWOOD.